United States Patent
Humphrey et al.

(10) Patent No.: US 7,050,796 B2
(45) Date of Patent: May 23, 2006

(54) METHOD OF CONTROLLING THE AUDITORY RESPONSE OF WIRELESS DEVICES

(75) Inventors: Thomas Ward Humphrey, Cincinnati, OH (US); Larry Dean Moore, Loveland, OH (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/056,738

(22) Filed: Jan. 25, 2002

(65) Prior Publication Data

US 2003/0143992 A1    Jul. 31, 2003

(51) Int. Cl.
*H04M 3/00* (2006.01)
*H04B 1/18* (2006.01)
*H04B 17/00* (2006.01)

(52) U.S. Cl. .................. 455/420; 455/177.1; 455/67.3

(58) Field of Classification Search ............. 455/158.1, 455/104.1, 200.1, 340, 341, 355, 64, 65, 455/420, 456.4, 556, 575, 404.1, 414.1, 414.2, 455/414.4, 418, 556.2, 557, 566, 419, 567, 455/177.1, 67.3, 67.13, 156.1; 379/201.01, 379/386; 704/274
See application file for complete search history.

(56) References Cited

U.S. PATENT DOCUMENTS

| | | | | |
|---|---|---|---|---|
| 5,224,151 A | * | 6/1993 | Bowen et al. | ........... 455/569.1 |
| 5,749,056 A | * | 5/1998 | Patterson et al. | ........ 455/569.1 |
| 5,933,778 A | | 8/1999 | Buhrmann et al. | |
| 6,018,671 A | * | 1/2000 | Bremer | ........................ 455/567 |
| 6,044,279 A | * | 3/2000 | Hokao et al. | ................ 455/567 |
| 2002/0010008 A1 | * | 1/2002 | Bork et al. | .................. 455/567 |
| 2002/0103908 A1 | | 8/2002 | Rouse et al. | |
| 2002/0165932 A1 | | 11/2002 | Rensin et al. | |
| 2003/0008687 A1 | * | 1/2003 | Nishimura | ................... 455/567 |
| 2003/0100261 A1 | | 5/2003 | Gusler et al. | |
| 2003/0143954 A1 | * | 7/2003 | Dettinger et al. | .............. 455/46 |
| 2004/0119591 A1 | * | 6/2004 | Peeters | ................... 340/539.26 |

FOREIGN PATENT DOCUMENTS

EP    957619 A1 * 11/1999

OTHER PUBLICATIONS

RABC Publication 01.3, "Use of Jammer and Disabler Devices for Blocking PCS, Cellular and Related Services," 2001, pp. 1-9, no month listed.
GAI-Tronics data sheet for the Nova 2001 pager module haivng ambient noise control of paging audio, no month listed.

* cited by examiner

*Primary Examiner*—Melody Mehrpour
(74) *Attorney, Agent, or Firm*—Wood, Herron & Evans, LLP

(57) ABSTRACT

Cellular telephones, pagers, PDAs, and other wireless devices, are configured to network together when in close proximity with each other, measure the relative sound pressure level of their environment, and modify the auditory response of the wireless device based on established parameters. In this way, a wireless device may detect when it is in a quiet room with multiple other devices, which is indicative of a meeting that should not be disturbed, and thus defeat or modify its behavior to reduce interruptions of group events.

15 Claims, 2 Drawing Sheets

METHOD OF CONTROLLING THE AUDITORY RESPONSE OF WIRELESS DEVICES

Cross-Reference to Related Application

The present application is related to application Ser. No. 10/056,740, filed on Jan 25, 2004, by Richard Dean Dettinger, et al., entitled "Method of Handling Wireless Device Intrusion into Populated Areas", assigned to the same assignee as the present application, and incorporated by reference herein in its entirety.

FIELD OF THE INVENTION

The present invention relates to control of personal wireless devices.

BACKGROUND OF THE INVENTION

The widespread use of cellular telephones, pagers, personal digital assistants (PDAs) and other wireless devices has adversely affected group events attended by people who use these devices. For example, attendees of large professional conferences often must deal with presentations being interrupted by cellular telephones ringing or pagers and personal digital assistants (PDAs) going off. This detracts from the overall effectiveness of the presentation while simultaneously annoying other attendees.

This problem occurs in other settings as well. At a movie theater, a person carrying a cellular telephone is a likely disturbance. When the cellular telephone rings, the remaining theater goers are disturbed. Even if the owner leaves the movie theater to take the call, in the process of leaving the theater, the owner distracts and blocks the view of others.

An almost infinite number of similar scenarios may occur, where wireless devices interrupt proceedings in a wide variety of settings, such as theaters, concert halls, restaurants, meeting rooms, hospitals, and other similar public venues.

In general, this problem persists in our culture not because people refuse to respect others, but rather because they simply forget to switch their devices to a non-intrusive or silent mode of operation. Wireless devices have become so commonplace that people often forget they have them.

As the widespread use of wireless devices has occurred only within the last several years, little effort has been put into preventing these devices from interrupting group events. Most of the attempts have been of the extremely "low tech" variety. Perhaps the first and simplest attempts have been the use of signs outside meeting areas or reminders given at the beginning of movies or presentations. These attempts have perhaps had a small degree of success; but surely, the situation will not improve as the number of wireless device users continues to grow.

Another solution is to use a jamming transmitter. Jamming transmitters for this type of application will typically have several independent oscillators from which jamming signals can be generated to block the use of certain frequency ranges. These types of jamming transmitters are often referred to as "barrage jammers." The frequency ranges targeted are those used by paging devices as well as those used for call establishment by cellular/personal communication systems (PCS) systems. Thus, when activated in a designated area, a barrage jammer will prevent all pagers and mobile phones located in that area from receiving and transmitting calls by means of radio frequency (RF) interference. Barrage jammers typically have poor frequency selectivity which leads to interference with a larger frequency bandwidth than that used by pagers and cellular/PCS systems.

Barrage jammers might be implemented without the cooperation from cellular/PCS providers, so long as there are adequate guard bands available. However, once jamming begins, counter-jamming may result, either by deliberate action of providers, or more likely by autonomous response of power control systems within the PCS/cellular systems.

Another concern with barrage jammers is that they increase the RF noise floor in areas adjacent to their area of use. Many cellular/PCS systems are required to work in all types of buildings under very low signal conditions, and the use of barrage jammers in the same band and vicinity, results in an increase in the noise floor that could mean the difference between receiving and not receiving a critical call. Due to these limitations, as well as others, barrage jammers are not particularly well suited to addressing the problem at hand.

Yet another solution is referred to as an intelligent cellular disabler. Unlike barrage jammers, intelligent cellular disablers do not transmit an interference signal on the control channels. Rather, an intelligent cellular disabler, when located in a designated "quiet" area, functions as a detector. An intelligent cellular disabler will have a unique identification number for communicating with the cellular network. When an intelligent cellular disabler detects the presence of a mobile phone in the quiet area, the intelligent cellular disabler communicates the presence of the mobile to the cellular network which in turn prevents the authorization of call establishment. This, in effect, filters calls to mobiles through software.

Since an intelligent cellular disabler is a software-based solution, calls may be routed to the call recipient's voice mail box, provided they subscribe to a voice mail service. Similarly, the detector may exempt users who have designated emergency status. These users must preregister their phone numbers with the service providers. Thus, when an incoming call arrives, the detector recognizes the number and the call is established for a specified maximum duration, e.g., two minutes. Users are also permitted to make outgoing calls routed to "911" type services.

Unlike barrage jammers, intelligent cellular disablers, being an integral part of the cellular/PCS systems, must be provisioned by the cellular/PCS service providers or by a third-party working cooperatively with full support of the cellular/PCS service providers.

Yet another solution is referred to as an intelligent beacon disabler. Like intelligent cellular disablers, intelligent beacon disablers do not transmit an interference signal on the control channels. Intelligent beacon disablers are located in a quiet area and function such that any compatible wireless device in the quiet area is instructed to disable its ringer or disable its operation, while within the coverage area of the beacon. Obviously, only wireless devices which have a compatible receiver would respond to the beacon. The beacon receivers would typically be built on some technology other than cellular or PCS, such as wireless paging, Bluetooth, etc. The Bluetooth standard, promulgated by Bluetooth SIG, Inc. ("Bluetooth") a not-for-profit trade association that promotes personal connectivity solutions based on the Bluetooth wireless technology. Accessible at the Internet address of www.bluetooth.org.

Intelligent beacon disablers do not cause interference or require any cooperation from cellular/PCS providers. However, intelligent beacon disablers do require compatible wireless devices. As such, effective deployment will be problematic for many years.

Yet another solution is referred to as a direct receive and transmit jammer. This type of jammer behaves like a small, independent and portable base station, which can directly interact intelligently or unintelligently with the operation of the local mobile phone. The jammer is predominantly in a receiving mode and will intelligently choose to transmit and block wireless devices if they are within close proximity of the jammer, thereby creating a quiet area.

This selective jamming technique uses a discriminating receiver to target the jamming transmitter. The benefit of such target selectivity is much less electromagnetic pollution in terms of raw power transmitted from and bandwidth used by the jammer. Therefore, this type of jammer is much less disruptive to passing traffic. The jammer only transmits long enough to prevent a cellular telephone from linking with the cellular/PCS network. Otherwise, no transmission occurs.

Selective jamming could be implemented without the cooperation of cellular/PCS providers, but could also negatively impact cellular/PCS operation. Like intelligent cellular disablers, this solution could be made to discriminate 911 calls and allow for "breakthroughs" during emergencies.

Still another solution uses electromagnetic interference (EMI) shielding. This solution uses EMI shielding techniques to make a room into what is known as a Faraday cage. Although labor intensive to construct, a Faraday cage essentially blocks, or greatly attenuates, virtually all electromagnetic radiation from entering or leaving the cage, that is, the quiet room.

With the current state of the art in EMI shielding techniques, and commercially available products one could conceivably implement a Faraday cage into the architecture of newly designed buildings for so-called "quiet conference" rooms. Unfortunately, all calls, including emergency calls, would be blocked, unless there were provisions to receive and decode emergency transmissions and then feed them through the cage to be retransmitted. Obviously this is an expensive and long term solution.

Governmental regulatory agencies may ultimately determine which one of these solutions is best to use or not to use. For example, in the United States, FCC Rule Part 15(5b) precludes the use of intentional interferers. Canada, the United Kingdom, Australia, France, and Japan all have similar prohibitions on jamming devices, although they are under evaluation in some countries.

It can thus be seen that, in light of current governmental regulations prohibiting the use of jamming devices, there is increasing need for a method of preventing the interruption of group events attended by people who use cellular telephones, pagers, PDAs, and other wireless devices.

SUMMARY OF THE INVENTION

The present invention resolves the problems of interruptions caused by wireless communications devices, in a manner which is autonomous, i.e., does not require arrangement of equipment other than the wireless devices themselves.

More specifically, wireless devices are configured to network together when in close proximity with each other, measure the relative sound pressure level of their environment, and modify the auditory response of the wireless device based on established parameters. Thus, for example, the wireless device may detect when it is in a quiet room with multiple other devices, which is indicative of a meeting that should not be disturbed.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
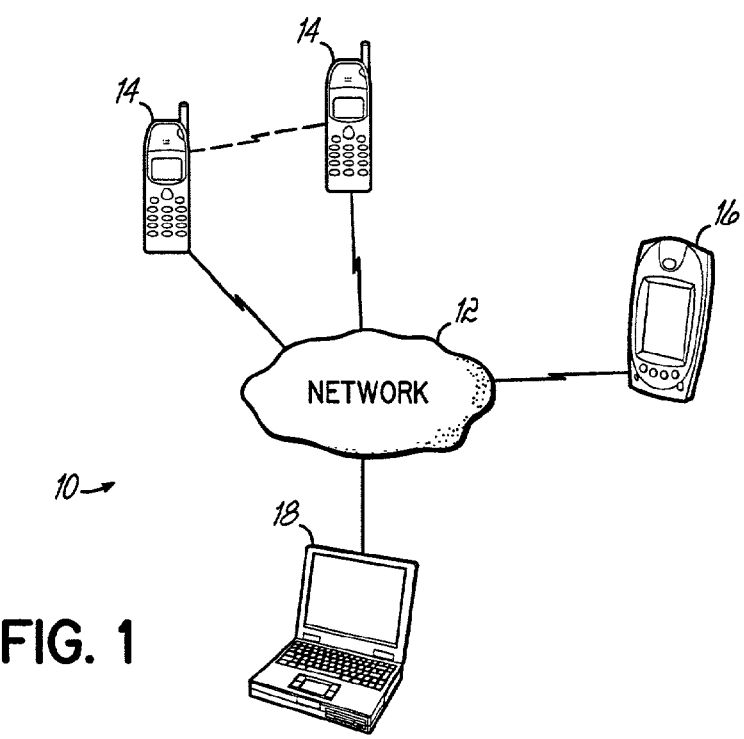
FIG. 1 is an illustration of variety of wireless devices networked together including a plurality of cellular telephones, a palm device, and a palm computer.

Turning to the Drawings, wherein like numbers denote like parts throughout the several views, FIG. 1 illustrates a network computing environment 10 consistent with principles of the present invention. As shown, various wireless devices are connected to a network 12 so that the devices are capable of communicating with one another. As also shown, a plurality of cellular telephones 14, a personal digital assistant (PDA) 16, and a palm computer 18 typify exemplary wireless devices. Network 12 may be implemented using Bluetooth or some other comparable networking protocol which provides similar functionality.

Figure 2:
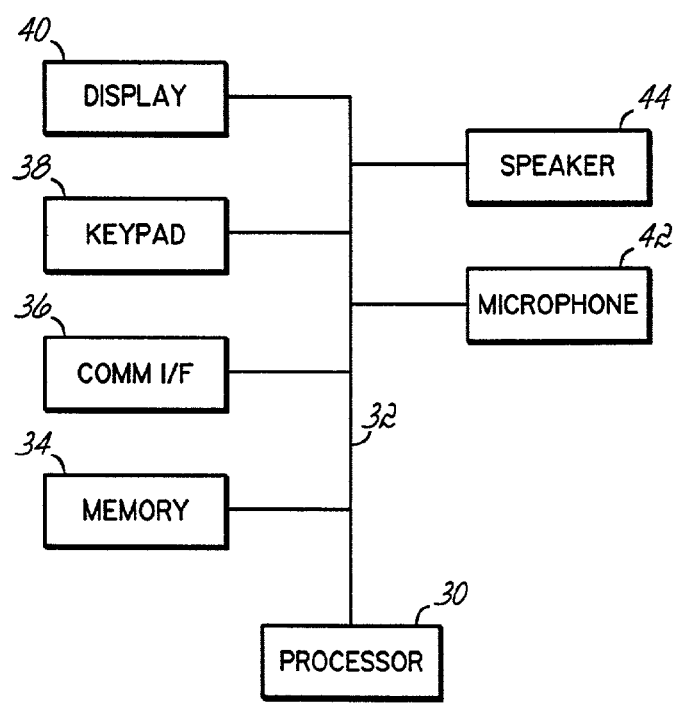
FIG. 2 illustrates an exemplary wireless device.

As seen in FIG. 1, the wireless device may take a variety of forms 14, 16, 18, but the functional elements of each wireless device take the general form shown in FIG. 2. As shown in FIG. 2, the typical wireless device includes a processor 30 capable of executing code, a memory 34 for storing code for the processor, a keypad 38, a display 40 and a communications interface 36. A microphone 42 and/or a speaker 44 may be included. Each of these elements is interconnected such as via a bus 32. The processor is capable of networking with another wireless device through communication interface 36. Users of the typical wireless device are able to interact with the program embodied in the code 34 executed by processor 30, through keypad 38 and a display 40, or alternatively microphone 42 and/or speaker 44. This typical configuration allows a user to make a selection, which modifies the auditory response of another wireless device networked with the typical wireless device. Exemplary code may include applications and operating systems such as PalmOS. However, other operating systems could provide similar functionality without departing from the spirit of the invention.

For example, turning once again to FIG. 1, suppose a user has scheduled a meeting from 1:00 pm to 2:00 pm on Tuesday, Nov. 19, 2002 on a personal digital assistant 16, such as a Palm Pilot, using the calender function in PalmOS code resident in memory 34 and executed by processor 30. In scheduling the meeting, the user may be prompted to select a behavior modification for the user's cellular telephone 14. Further suppose that in this particular instance, the user was prompted and selected shutting off the ringer. The personal digital assistant 16 then networks with the cellular telephone 14 using, e.g., Bluetooth, so that the auditory response of the cellular telephone 14 is modified based on the user selection in the personal digital assistant. Thus, in this example, on Tuesday, Nov. 19, 2002 from 1:00 pm to 2:00 pm, the ringer of the cellular phone 14 will be shut off. Such modifications of the auditory behavior of wireless devices may include, but are not limited to, shutting off the ringer, silent mode, suppression of all but emergency communications, and/or an automatic response sent to callers.

Figure 3:
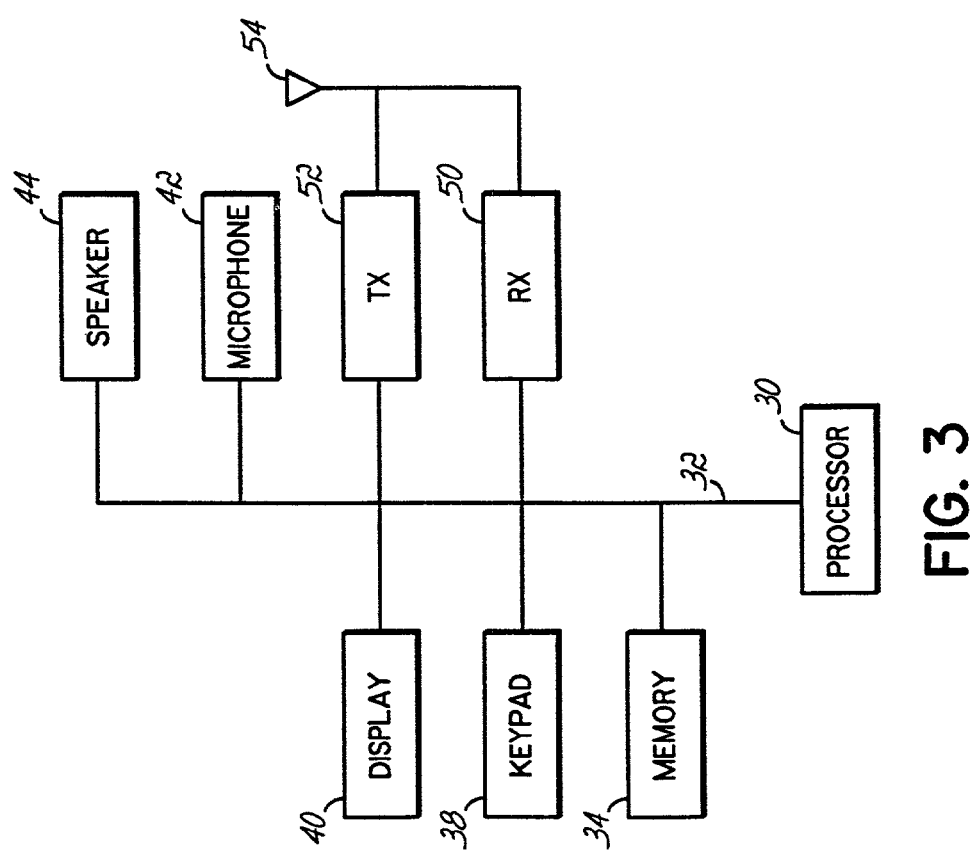
FIG. 3 illustrates an alternative embodiment of the present invention combining the functionality of the cellular telephone and palm device of FIG. 1.

Alternate forms of the invention are also possible. For example, the functionality of the cellular telephone 14 and personal digital assistant 16 could be combined into a single wireless device with calendering functions. In this embodiment, networking between devices is not required. FIG. 3 illustrates such an embodiment. The functionality of the receiver and transmitter portion of the cellular telephone is realized in receiver 50 and transmitter 52, which receive and transmit through antenna 54. Once again the input/output functionality is provided by a keypad 36, a display 38, a microphone 42, and a speaker 44. Similarly, a processor 30 executes code resident in memory 34 whereby a user may, through a scheduling application, modify the auditory response of the speaker 44 associated with cellular telephone portion of the device during some time period.

As previously described in conjunction with FIG. 1, wireless devices may be configured to network together. As the number of devices networked together begins to increase, at some point it becomes reasonable to conclude that a user with a particular wireless device is in a crowded area. Having reached this conclusion, only one piece of additional information is necessary to determine whether or not to modify the auditory response of that particular wireless device. That piece of information is available by sampling the microphone of the wireless device. If the sample from the microphone indicates that the wireless device is in a noisy area, then no action will be taken to modify the auditory response of the device. An example of this circumstance may be a crowded city street. However, if the sample from the microphone does not indicate that the wireless device is in a noisy area, then the auditory response of the device is modified. An example of this circumstance might be a professional conference or seminar.

Figure 4:
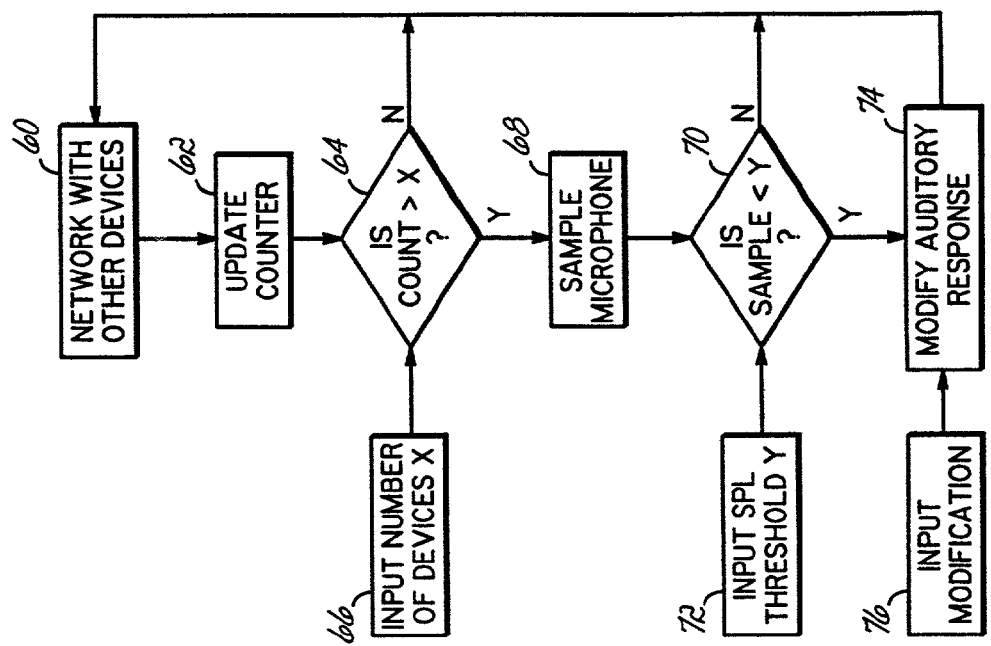
FIG. 4 is a flow chart for an application illustrating activities of a wireless device in accordance with an aspect of the present invention.

Turning now to FIG. 4, a flow chart of an application for a wireless device in accordance with this aspect of the present invention is illustrated. The wireless device begins by networking with other devices in step 60. Each time the wireless device establishes or loses connectivity with another device a counter is incremented or decremented, respectively, in step 62. Thus, the counter maintains a current count of the number of the devices the wireless device is networked with.

In step 64, a comparison is made between the count and a threshold number of devices. The threshold number of devices, e.g., X, is input in step 66 and may be downloaded via a wireless provider or coded into the application.

If the number of devices the wireless device is networked with is less than the threshold X, the wireless device continues networking with other devices. However, if the number of devices exceeds the threshold X, a sample is taken from the wireless device microphone in step 68. The sample represents the sound pressure level of the environment the wireless device is currently in.

In step 70, the sample is compared to a sound pressure level threshold, e.g., Y. The sound pressure level threshold may also be downloaded via the wireless provider or coded into the routine, as shown in step 72. If the sample sound pressure level exceeds the threshold Y, the wireless device takes no further action, and continues networking with other devices. Thus, the low sound pressure level indicates that the wireless device is in a crowed noisy environment and no modification to the auditory response of the wireless device is necessary. However, if the sample sound pressure level is less than the threshold Y, the wireless device is determined to be a crowded quiet environment and the auditory response should be modified so as not to disturb others.

Step 74 shows the modification of the auditory response. The auditory response modification may be based on a selection provided by the wireless provider or alternatively, the wireless device user may be able to select from a menu of modifications. Again, such modifications include, but are not limited to, shutting off the ringer, silent mode, suppression of all but emergency communications, and/or an automatic response sent to callers.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the present invention has been described in the context of various wireless devices, those skilled in the art will appreciate that the mechanisms of the present invention are capable of being distributed as a program product in a variety of forms, such as a program for a wireless device such as a PDA using Palm OS or another operating system, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling the response of a wireless communication device comprising the following steps:
   providing a first wireless communication device capable of audibly responding;
   networking said first device with a number of other wireless devices;
   sampling the sound pressure level through a microphone used by the first device; and,
   selecting to modifying the audible response of the first device based on a count of other networked devices and the sampled sound pressure level.

2. The method of claim 1 wherein the first device is a cellular telephone.

3. The method of claim 1 wherein the other wireless communication devices are cellular telephones.

4. The method of claim 1 wherein the first device is networked with the other wireless devices using Bluetooth.

5. The method of claim 1 wherein the modification of the response of the first wireless communication device prevents the first wireless communication device from sounding an audible alert in response to a wireless communication.

6. A wireless communication device comprising:
a processor,
a wireless communications interface,
a speaker for producing an audible response,
a microphone, and
storage for executable code,
the processor executing the executable code to allow a provider to input threshold parameters, network the device with other wireless devices, sample the sound pressure level through the microphone, make comparisons between the threshold parameters and a count of other devices networked with the device, and the sampled sound pressure level, and modify the audible response of the wireless communication device based on the comparisons.

7. The wireless device of claim 6 wherein the wireless communication device is a cellular telephone.

8. The wireless device of claim 6 wherein the wireless communication device is a personal digital assistant.

9. The wireless device of claim 6 wherein the executable code includes Bluetooth software.

10. The wireless device of claim 6 wherein the selection to modify the response of the wireless communication device prevents the wireless device from sounding an audible alert in response to a wireless communication.

11. A program product for a wireless communication device, the program product comprising:
executable code to allow a provider to input thresholds for comparison to a count of networked devices and a sampled sound pressure level and in response modify the audible response of the wireless device, and a signal bearing media carrying said executable code.

12. The program product of claim 11 wherein the executable code further includes networking code for networking with other devices.

13. The program product of claim 12 wherein the networking code comprises Bluetooth compatible networking code.

14. The program product of claim 13 wherein the modification of the response of the wireless communication device to wireless communications comprises preventing the wireless communication device from sounding an audible alert.

15. The program product of claim 11 wherein said signal bearing media is a transmission-type media.

* * * * *